United States Patent [19]

Myers

[11] 3,718,810

[45] Feb. 27, 1973

[54] CARDINAL-ORDINAL DIGITAL CALCULATORS AND COMPUTERS

[75] Inventor: Paul K. Myers, Seattle, Wash.

[73] Assignee: Cardinal-Ordinal Corporation, Seattle, Wash.

[22] Filed: July 29, 1971

[21] Appl. No.: 167,387

[52] U.S. Cl. ....................................235/156, 235/154

[51] Int. Cl. ..............................G06f 7/38, G06f 3/00

[58] Field of Search ..............................235/156, 154

[56] References Cited

UNITED STATES PATENTS 3,353,008 11/1967 Kitz et al. .........................235/156 X

*Primary Examiner*—Malcolm A. Morrison

*Assistant Examiner*—James F. Gottman

*Attorney*—Theron H. Nichols

[57] ABSTRACT

A calculator comprising a conventional cardinal calculator having an input keyboard unit, a central processing unit input and output, and an output display unit wherein the connections on the central processing unit input from all terminals on the input keyboard unit are shifted down to that of the next lower numeral in the central processing unit input. The connections on the output display unit from all terminals on the central processing unit output are shifted up to that of the next upper numeral in the output display unit resulting in an ordinal calculator for producing an ordinal number sum, difference, product, or quotient answer from an input and subsequent computation of two ordinal numbers. With the addition of a gang switch for shifting all these connections by one terminal, a cardinal-ordinal calculator results for utilizing either or both cardinal and ordinal numbers. Two modifications of the ordinal calculator and two modifications of the cardinal-ordinal calculator are disclosed. For computer use it is only necessary that the computer program instruct the operator when to shift from cardinal to ordinal operation or vice versa.

26 Claims, 9 Drawing Figures

FIG. 1 ORDINAL DECIMAL MACHINE
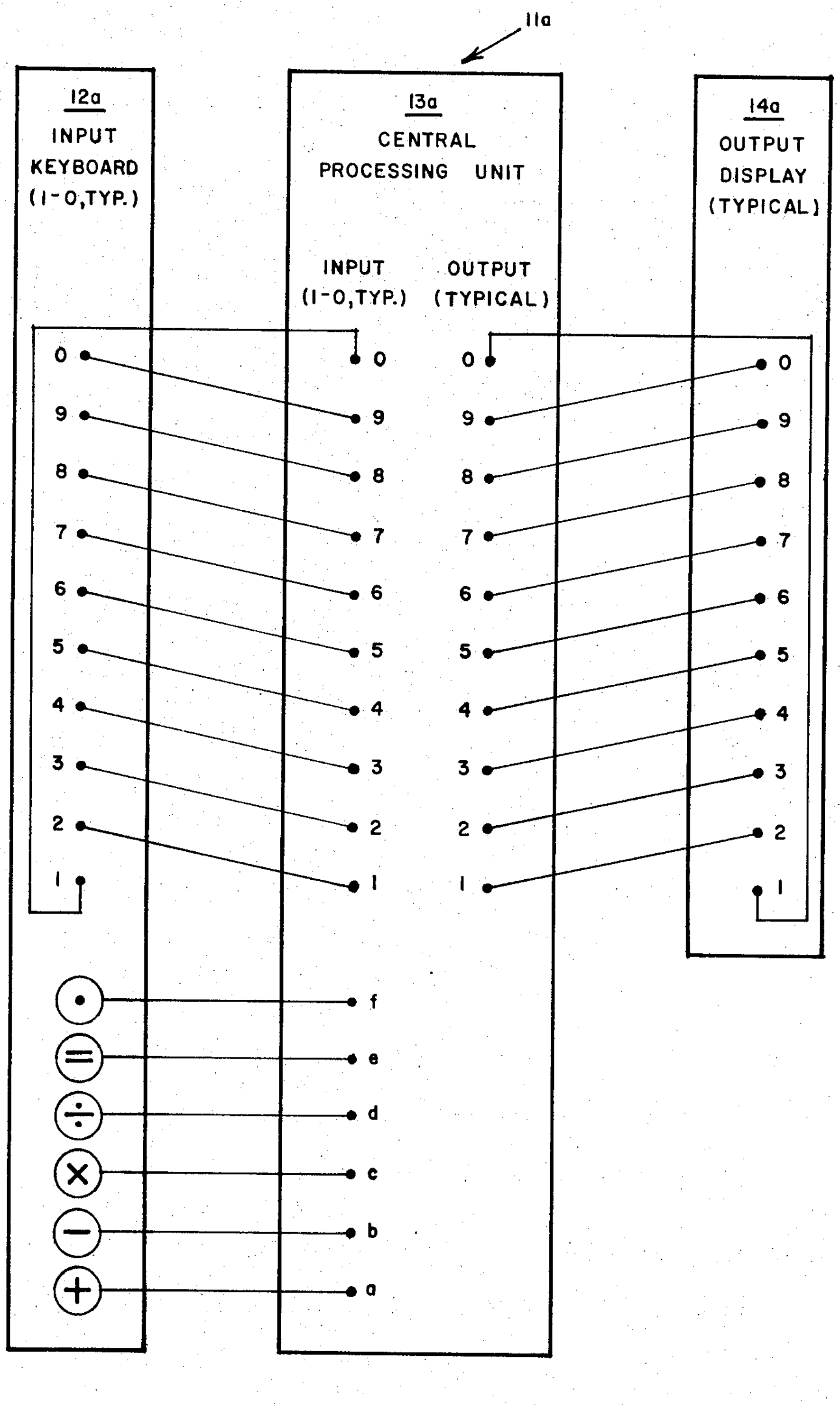
INVENTOR
PAUL K. MYERS
BY Theron H. Nichols
AGENT FIG. 2 MECHANICAL OUTPUT DISPLAY
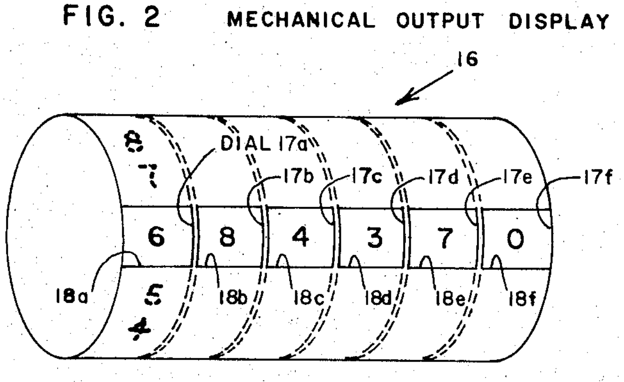
FIG. 3 ELECTRONIC OUTPUT DISPLAY
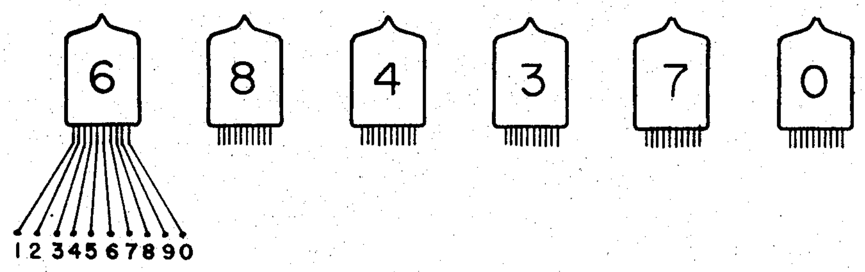
FIG. 6 CARDINAL-ORDINAL INPUT KEYBOARD
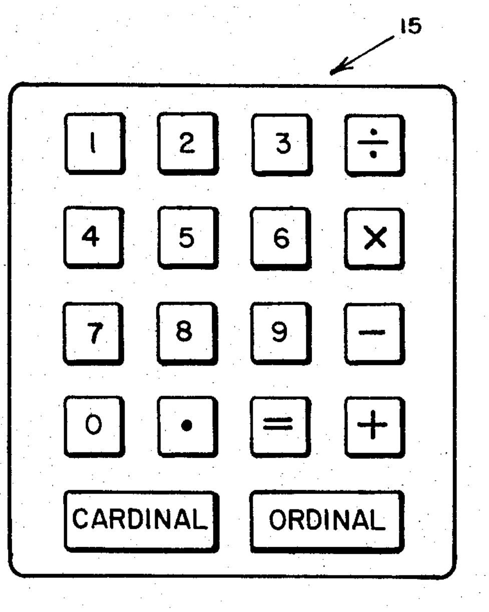
INVENTOR
PAUL K. MYERS
BY Theron H. Nichols
AGENT FIG. 4 ORDINAL BINARY MACHINE
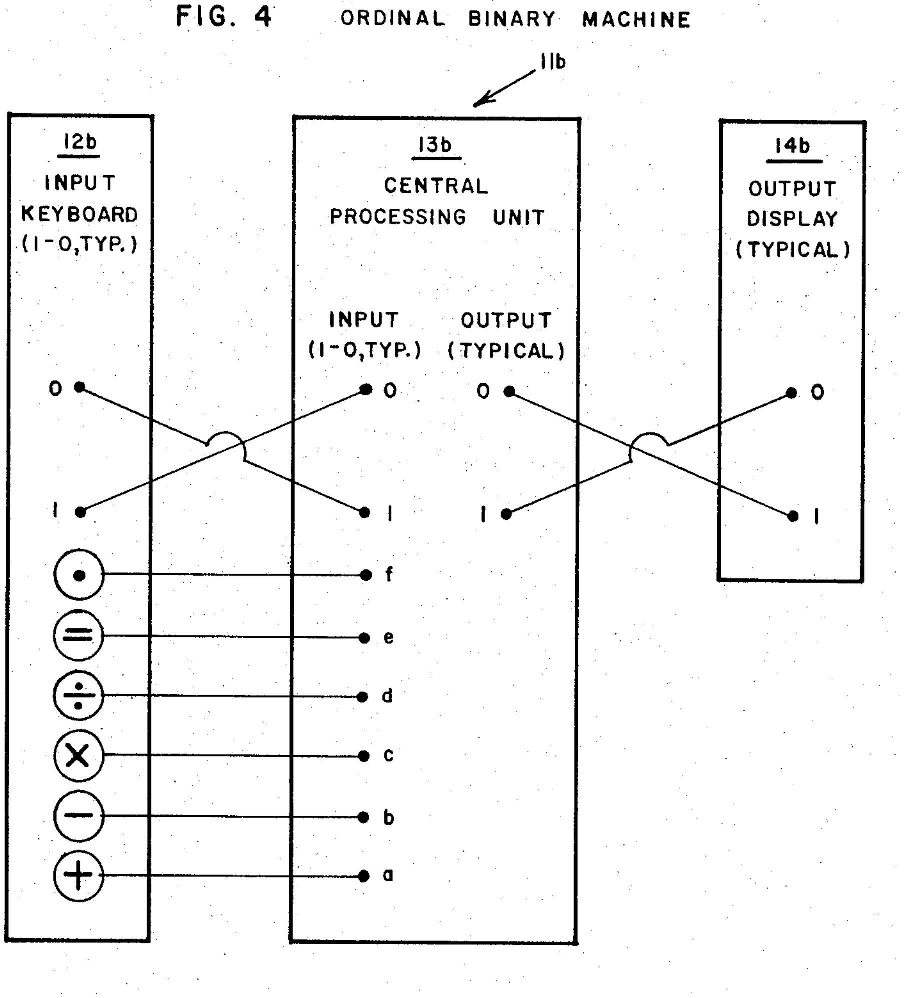
INVENTOR
PAUL K. MYERS
BY Theron H. Nichols
AGENT

FIG. 5 CARDINAL-ORDINAL DECIMAL MACHINE

INVENTOR
PAUL K. MYERS
BY Theron H. Nichols
AGENT

FIG. 7 CARDINAL-ORDINAL BINARY MACHINE
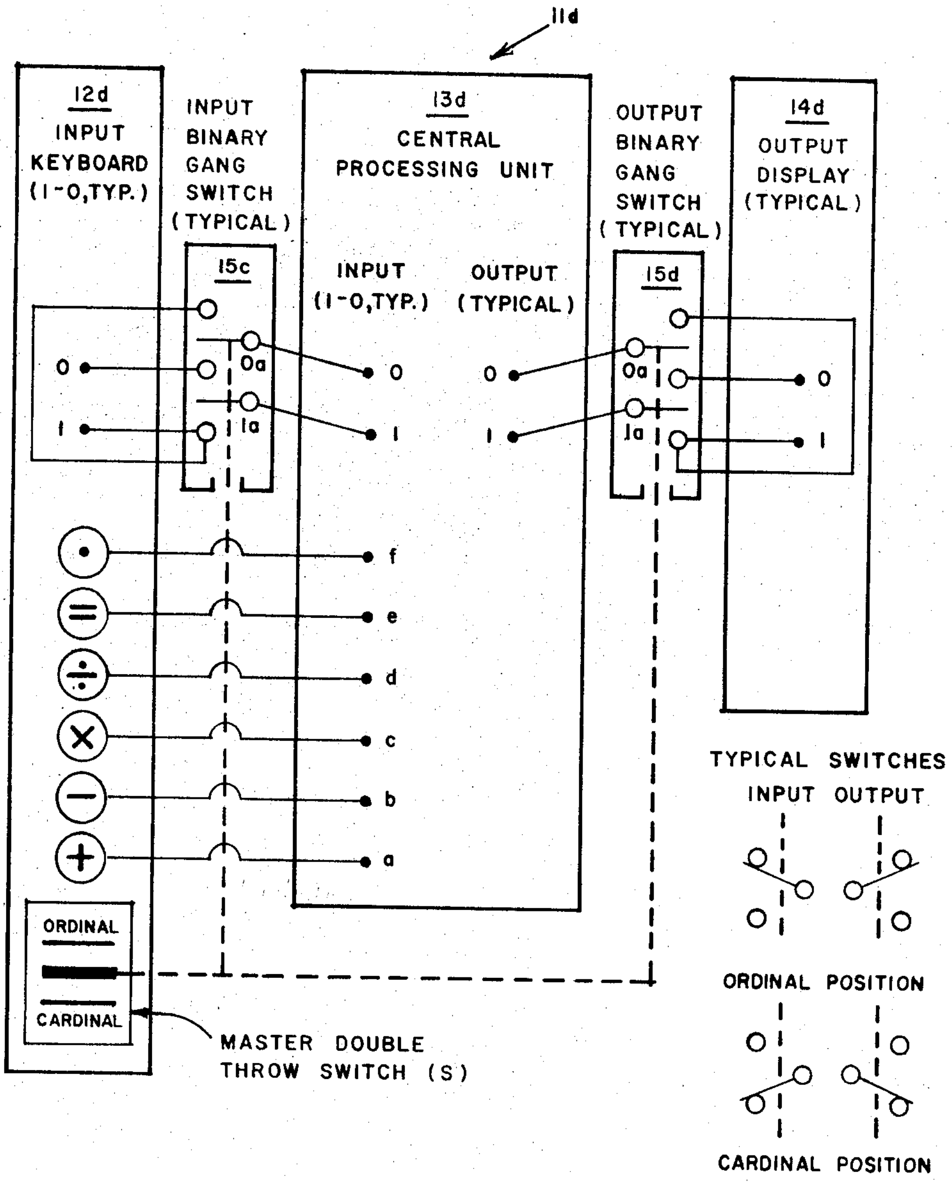
INVENTOR
PAUL K. MYERS
BY [signature]
AGENT

CARDINAL-ORDINAL DIGITAL CALCULATORS AND COMPUTERS

OBJECTS OF THE INVENTION

A principal object of this invention is to provide an ordinal calculator that will generate an ordinal number answer from an input of two or more ordinal numbers.

Another object of this invention is to provide a calculator that may be changed at will to either a cardinal calculator or an ordinal calculator.

A further object of this invention is to provide a cardinal-ordinal calculator which will operate with both cardinal and ordinal numbers for providing either the desired cardinal or ordinal answer.

A still further object of this invention is to provide a cardinal-ordinal calculator that is easy to operate and is of simple configuration and economical to form and assemble.

Other objects and various advantages of the disclosed calculators will be apparent from the following detailed description, together with the accompanying drawings, submitted for purposes of illustration only and not intended to define the scope of the invention, reference being made for that purpose to the subjoined claims.

BRIEF DESCRIPTION OF THE DRAWINGS

The drawings diagrammatically illustrate by way of example, not by way of limitation, several forms of the invention wherein like reference numerals designate corresponding parts in the several views in which:

FIG. 1 is a schematic block diagram of a new ordinal calculator with parts in section for performing arithmetical computation with decimal ordinal numbers;

FIG. 2 is a schematic perspective view of a mechanical dial register having six typical dials for all calculators;

FIG. 3 is a schematic elevation view of six typical electronic display tubes for all calculators;

FIG. 4 is a schematic block diagram of another ordinal calculator with parts in section for performing arithmetical computation with binary ordinal numbers;

FIG. 6 is a schematic plan view of a typical input keyboard of FIG. 5; and

FIG. 7 is a schematic block diagram of another cardinal-ordinal calculator for performing arithmetical computation with both binary cardinal and ordinal numbers.

PURPOSE OF THE CARDINAL-ORDINAL CALCULATORS

Figures 5, 5A, 5B:
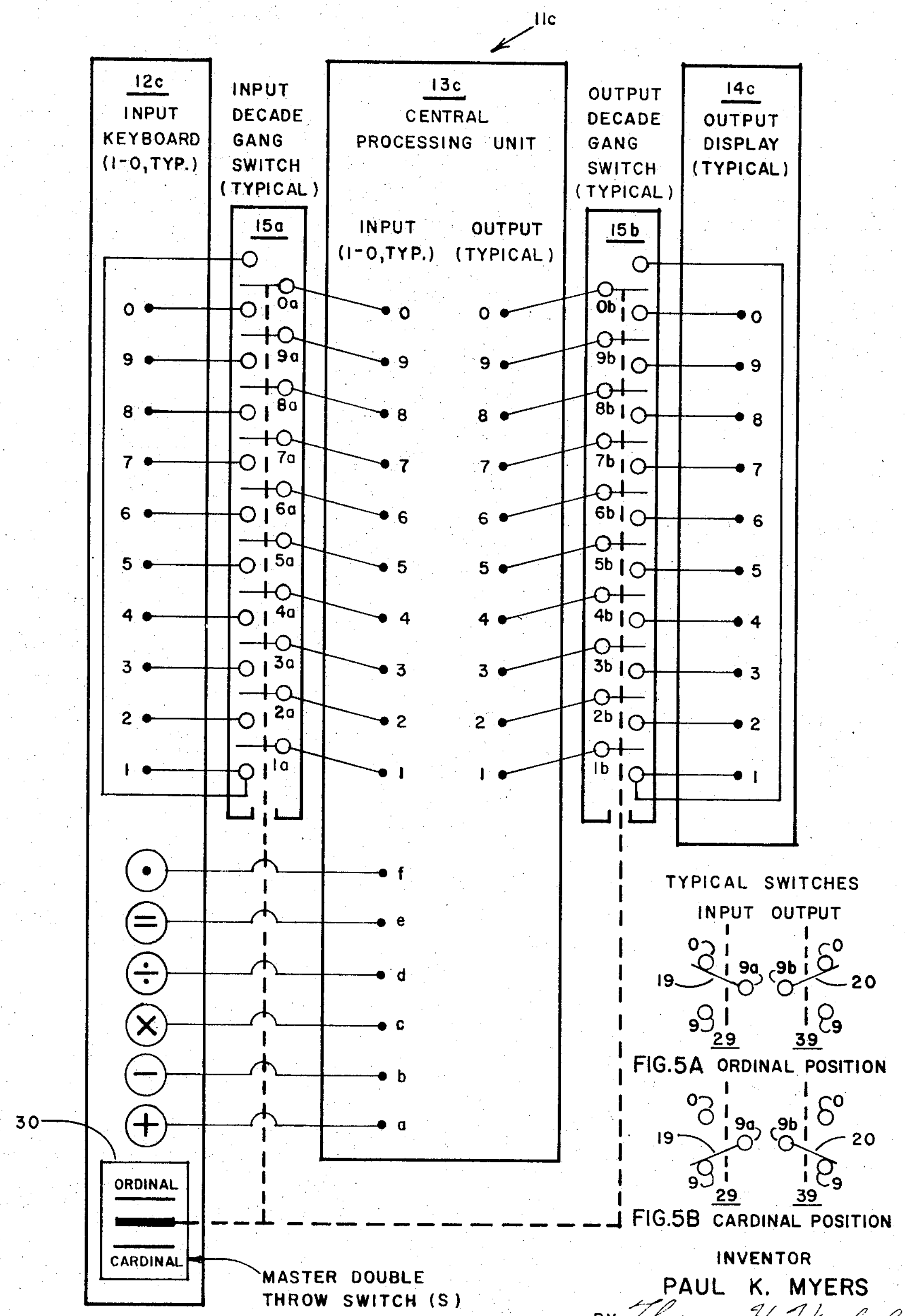
FIG. 5 is a schematic block diagram of another cardinal-ordinal calculator for performing arithmetical computation with both decimal ordinal and cardinal numbers.
FIG. 5A illustrates schematically two typical switches of input and output gang switches in the ordinal position.
FIG. 5B illustrates schematically two typical switches of input and output gang switches in the cardinal positions.

The invention disclosed herein, the scope of which being defined in the appended claims, is not limited in this application to the details of construction and arrangement of parts shown and described, since the invention is capable of other embodiments and of being practiced or carried out in various other ways. Also, it is to be understood that the phraseology or terminology employed herein is for the purpose of description and not of limitation.

The cardinal portion of the cardinal-ordinal calculator is a conventional calculator for performing four of the basic cardinal arithmetic operations thereon, as addition, subtraction, multiplication, and division.

In industry, cardinal numbers may be illustrated as, the amount of material, the amount of money, the incoming quality of each part, outgoing quality of production parts, average fraction of total number of production parts that require inspection, etc. All of these numbers may be easily coordinated with each other.

The ordinal number is that form of the number which shows the order of anything in a series, opposite to "-cardinal," and is ordinarily formed from cardinals by adding the article "the" or the suffix "th", as "the fourth", "the fifth", "the sixth", etc. Examples are order numbers, part numbers, work order numbers, serial numbers, sequence numbers, lot numbers, route numbers, location numbers, decimalized calendar dates, schedule day number, start schedule number, and completion day number, which are not easily coordinated with each other.

The ordinal portion of the cardinal-ordinal calculator is new. It provides:

a. continuous statistical reliability checkout of machine tools and production processes.

b. decimalizing of factory and industrial filing systems and assembly systems.

c. lead time calculations in decimal digit form.

d. production and inspection scheduling.

e. acceptance by the calculator input of grammatical ordinals, and f. display by the calculator output of grammatical ordinals.

Also, in the modifications of FIGS. 5 and 7, the new calculator may combine cardinal and ordinal calculations.

Likewise, all numbering systems may be reduced to decimal standard and utilized in the new computer.

FIG. 1 discloses schematically a block diagram of one, 11*a*, of the new ordinal calculators, which may be either a mechanical, electro-mechanical, or electronic calculator comprising the three basic portions, an input keyboard unit 12*a*, central processing unit 13*a*, and an output display unit 14*a*. There are ten terminals illustrated and arranged vertically and identified as 1, 2, 3, 4, 5, 6, 7, 8, 9, and 0 (idenfied as the tenth numeral) on the input keyboard unit, on the central processing unit input, on the central processing unit output, and the output display unit. Numerals 1 to 0 identify the keys on the input keyboard unit and the readouts on the output display unit. The word "terminal" is also used to identify a "key", both terms include the whole electrical connection required with each key or terminal. The term "calculator," used herein, implies both calculators and computers.

CONVENTIONAL CARDINAL CALCULATOR

In all the units, if all the first terminals 1 were interconnected, all the second terminals 2 were interconnected, all the third terminals 3 were interconnected, etc., the result is defined as a conventional cardinal calculator that would perform either of the four types of mathematical computations, depending on which of the four keys on the input keyboard unit was depressed and activated. The addition key + is connected to terminal *a*, the subtraction key − is connected to terminal *b*, the multiplication key × is connected to terminal *c*, the division key is connected to terminal *d*, the total or equal key = is connected to terminal *e*, and the decimal point . is connected to terminal *f*, each of terminals *a, b, c, d, e*, and *f*, being on the central processing unit 13 for control thereof. The central processing unit accomplishes all arithmetic and control functions of the calculator.

DESCRIPTION OF NEW ORDINAL CALCULATOR FOR DECIMAL ORDINAL NUMBERS

The new ordinal calculator **11*a* comprises the above described conventional cardinal calculator with the connections on the central processing unit 13*a* input from the input keyboard 12*a* being shifted down one step or one terminal as illustrated in FIG. 1. Likewise all connections on the output display 14*a* from the central processing unit 13*a* output are shifted up one step or one terminal as illustrated in FIG. 1**. The resulting calculator is the new ordinal calculator.

This calculator will compute ordinal additions, differences, products, and quotients between any two, or more, ordinal numbers, the calculator requiring any number of units, for the input and output portions. As many as four basic operational computations may be performed on ordinal numbers by the calculator of FIG. 1.

An example of adding two ordinal numbers is, after the addition + key is activated, and two numeral keys, as 5 and 6 are energized. Numeral keys 5 and 6 on the input keyboard unit activate the respective terminals 4 and 5 of the central processing units' inputs. The central processing units' outputs activate their terminal 9, which in turn activates the output display unit's terminal 0. The resulting sum of the two ordinal numbers 5 and 6 is the ordinal number 0 (the tenth).

Other typical illustrative ordinal arithmetical operations are:

Subtraction: 9 − 5 = 5
Multiplication: 3 × 5 = 9
Division: 20 0 = 3.22 = the 2nd hundredth belonging to the 2nd tenth of the 3rd one.
Distributive: 5 × (3 + 4) = (9 + 23) = 31 = the 1st one of the 3rd ten.

Symbol 1 is the "understood value" meaning that if an ordinal number is written it is understood that symbols one are implied. Eg: Ordinal 5 can be used in any one of the following equivalent ordinal symbolisms:

5 = 15 = 115 = 1115 = 5.1 = 5.11 = 5.111 = 15.1 = 115.11 = 1115.111, the form 15, the fifth one of the first ten, can be used to identify 5 as an "ordinal 5."

For cardinal numbers the "0" symbol zero is the understood value in that if 0 is not written, it is implied.

Eg: The cardinal decimal digit 5 can be written in any of the following equivalent forms:

5 = 05 = 005 = 5.0 = 5.00 = 5.000 = 05.0 = 005.00 = 0005.000 .

The form 05 can be used to identify 5 as a "cardinal 5."

FIG. 2 is a schematic perspective view of an output display consisting of mechanical rotary dial registers 16 for use with the mechanical and electro-mechanical modifications of the disclosed calculators of FIGS. 1 and 5. The register comprises a plurality of dials, **17*a* to 17*f*. The dials of this register 16 are turned by the calculator 13*a* of FIG. 1 to present the correct number in the illustrated windows 18*a* to 18*f*** for each dial. The basic axioms for the ordinal number n (the nth) are as follows:

1. Axioms of Addition and Multiplication $$1 = 1 \times n \text{ (the first = the first times the nth)}$$

$$n = 1 + n = 2 \times n$$

$$n + n = 1 + n + n = 3 \times n$$

2. Axioms of Multiplication and Exponentiation $$2 = n^1 \text{ (the second = the nth to the first power)}$$

$$n = 2 \times n = n^2$$

$$n \times n = 2 \times n \times n = n^3$$

($n^3$ is a geometrical circle; 3 = center-circumference-radius; the center, represented by the 1st power, is understood)

Alternate displays may consist of electronic display tubes or typed printed readouts as disclosed in FIG. 3.

FIG. 3 illustrates six electronic display tubes of a preferred twenty tube display for the electronic calculator.

DESCRIPTION OF ORDINAL CALCULATOR FOR BINARY ORDINAL NUMBERS

FIG. 4 illustrates the binary counterpart of the preceding calculator of FIG. 1. This ordinal calculator **11*b* likewise comprises the three portions comprising an input keyboard unit 12*b*, a central processing unit 13*b*, and an output display unit 14*b*** of a conventional cardinal calculator, but with the connections between the terminals raised up one terminal to form the new ordinal binary calculator.

Thus, two binary ordinal number terminals 1 and 0 on an input keyboard unit **12*b* are connected to two terminals 0 and 1, respectively, of a central processing unit 13*b* input, and two terminals 1 and 0 of a central processing unit 13*b* output are connected to two terminals 0 and 1, respectively, of an output display unit 14*b***.

Similarly to FIG. 1, the selective operation keys +, −, ×, , =, and . on the input keyboard unit, **12*b* of FIG. 4**, are connected to their respective terminals *a, b, c, d, e*, and *f* for controlling the central processing unit **13*b*** for generating the selective mathematical function with binary ordinal numbers.

Symbol 1 is the "understood value" meaning that if an ordinal number is written it is understood that symbols one are implied. Eg.: Ordinal 0 (the second) can be used in any one of the following equivalent ordinal symbolisms 0 =10 = 110 = 1110 = 0.1 = 0.11 = 0.111 = 10.1 = 110.11 = 1110.111 .

The cardinal binary digit 1 can be written in any of the following equivalent forms.

1 = 01 = 001 = 0001 = 1.0 = 1.00 = 1.000 = 01.0 = 001.00 = 0001.000 .

The form 01 can be used to identify 1 as a cardinal 1 .

DESCRIPTION OF DUAL PURPOSE DECIMAL CARDINAL AND ORDINAL CALCULATOR

FIG. 5 illustrates schematically a dual purpose decimal cardinal and ordinal calculator 11*c* comprising the three basic portions interconnected with gang switches. Thus, a conventional input keyboard unit 12*c* of the usual ten units, is shown having ten terminals, for example, as terminals 1 to 0 (0 being the tenth) with connections to terminals 1*a* to 0*a*, respectively, in input decade gang switch 15*a*.

The ten terminals 1*a* to 0*a*, FIG. 5, of decade gang switch 15*a* are each connected to its respective, stepped down terminal 1 to 0 on the central processing unit 13*c* input. Likewise the decade gang switch 15*b* with its ten terminals 1*b* to 0*b* is interconnected between the respective stepped down terminals 1 to 0 of the central processing unit 13*c* output and the respective terminals 1 to 0 of the output display unit 14*c*. While only one output display unit is illustrated, there are preferably twenty in number.

When key " is depressed, then the symbol "0" is defined as zero in cardinal numbers. However, when key "ORDINAL" is depressed, then the symbol "0" is defined as "the tenth" in ordinal numbers.

Likewise in FIG. 5, the selective operation keys +, −, ×, , =, and decimal point . on the input keyboard unit 12*c* are connected to their respective terminals *a*, *b*, *c*, *d*, *e*, and *f* for controlling the central processing unit 13*c* for generating the selective mathematical function with either or both cardinal and ordinal numbers, depending on the actuation and setting of the gang switches 15*a* and 15*b*.

FIG. 5A illustrates one switch 29 of the ten typical single pole double throw switches, all of which form the ten pole double throw decade gang switch 15*a*, and one switch 39 of the typical single pole double throw switches which form the ten pole double throw decade gang switch 15*b*. A portion of the central processing unit 13*c*, FIG. 5A, is illustrated between the two gang switches. These two switches 29 and 39, FIG. 5A are illustrated in the up or "ORDINAL" position where they would be when master switch 30 on the input keyboard unit 12*c* is actuated to up or "ORDINAL" position. Switch 9*a* is shown with its contact element 19 pivoted upwardly to contact ordinal terminal 0 of the switch and thus is connected to terminal 0 of the input keyboard unit 12*c*. Likewise, switch 9*b* is shown with its contact element 20 pivoted upwardly to contact ordinal terminal 0 of the switch 9*b* and thus is connected to terminal 0 of the output display unit 14*c*.

FIG. 5B illustrates the two switches 29 and 39 of gang switches 15*a* and 15*b* actuated to the cardinal position as indicated by master switch 30 being so positioned wherein the contact element 19 of switch 29 is pivoted downwardly to contact cardinal terminal 9 of the switch 29 and thus is connected to terminal 9 of the input keyboard unit 12*c*. Likewise, switch 9*b* is illustrated with its contact element 20 pivoted downwardly to contact cardinal terminal terminal 9 of the switch 9*b* and thus is connected to terminal 9 of the output display unit 14*c*.

All the individual switches of all the two typical gang switches 15*a* and 15*b* are connected in parallel so that all are actuated either to the up or ordinal position as controlled by master switch 30 when in its up or "ORDINAL" position, or all switches are actuated to the down or "CARDINAL" position as controlled by master switch 30 in its down or "CARDINAL" position.

For computer use it is only necessary that the computer program instruct the operator when and which of the cardinal or ordinal positions to use on the master switch.

In operation of the dial register of FIG. 2 when used in the calculator of FIG. 5, depression of the "ORDINAL" key rotates all decimal dials simultaneously so that all dials read the next digit above the previous cardinal register. Also, depression of the "CARDINAL" key rotates all decimal dials simultaneously so that all dials read the next digit below the previous ordinal register.

FIG. 3 illustrates six electronic display tubes of a preferred twenty tube display for the electronic calculator.

Depressing the "ORDINAL" key electronically rotates all decimal electronic display tube terminals simultaneously so that all terminals read the next digit above the previous cardinal register.

Depressing the "CARDINAL" key electronically rotates all decimal tube terminals simultaneously so that all terminals read the next digit below the previous ordinal register.

FIG. 6 is a schematic plan view of a typical input keyboard 15 for use with all modifications of the disclosed calculator. It has keys for the ten numbers 1 to 0, the four selective operation keys +, −, ×, , a decimal point . , and equal sign =, a CARDINAL number computation control key and an ORDINAL number computation control key. The penultimate key listed is utilized only on modifications of the calculator which can mix or calculate both cardinal and ordinal numbers, as only the last two modifications of FIGS. 5 and 7, since the embodiments of DIGS. 1 and 4 calculate only ordinal numbers.

This typical or representative push button input keyboard 15 is used in all types of calculators utilized herein, as an all-mechanical, electro-mechanical, electrical, or electronic decimal ordinal calculator.

OPERATION OF CARDINAL-ORDINAL CALCULATOR

The cardinal-ordinal calculator will compute the cardinal or ordinal sum, difference, product, or quotient of a cardinal and a cardinal, a cardinal and an ordinal, an ordinal and a cardinal, and an ordinal and an ordinal.

While the conventional or cardinal calculator can perform four basic mathematical operations, as add, subtract, multiply, and divide cardinals only, the disclosed cardinal-ordinal calculator can perform 32 basic operations.

These 32 operations are:

ADDITION

1.* Cardinal added to a cardinal yielding a cardinal sum 6+5=11
2. Cardinal added to a cardinal yielding an ordinal sum 6+5=22
3. Cardinal added to an ordinal yielding a cardinal sum 6+5=10
4. Cardinal added to an ordinal yielding an ordinal sum 6+5=21
5. Ordinal added to a cardinal yielding a cardinal sum 6+5=10
6. Ordinal added to a cardinal yielding an ordinal sum 6+5=21
7. Ordinal added to an ordinal yielding a cardinal sum 6+5=9
8.**Ordinal added to an ordinal yielding an ordinal sum 6+5=0

SUBTRACTION

1.*Cardinal minus a cardinal yielding a cardinal diff. 9−5=4
2. Cardinal minus a cardinal yielding an ordinal diff. 9−5=5
3. Ordinal minus a cardinal yielding a cardinal diff. 9−5=3
4. Ordinal minus a cardinal yielding an ordinal diff. 9−5=4
5. Cardinal minus an ordinal yielding a cardinal diff. 9−5=5
6. Cardinal minus an ordinal yielding an ordinal diff. 9−5=6
7. Ordinal minus an ordinal yielding a cardinal diff. 9−5=4
8. **Ordinal minus an ordinal yielding an ordinal diff. 9−5=5

MULTIPLICATION

1.*Cardinal multiplied by a cardinal yielding a cardinal 3×5=15
2. Cardinal multiplied by a cardinal equals an ordinal 3×5=6
3. Cardinal multiplied by an ordinal equals a cardinal prod. 3×5=12
4.*Cardinal multiplied by an ordinal yielding a cardinal product* 3×5=23
5. Ordinal multiplied by a cardinal yielding a cardinal product 3×5=10
6. Ordinal multiplied by a cardinal yielding an ordinal product 3×5=21
7. Ordinal multiplied by an ordinal yielding a cardinal product 3×5=8
8.** Ordinal multiplied by an ordinal yielding an ordinal product 3×5=9

DIVISION

1.*Cardinal divided by a cardinal yields a cardinal quotient 9/3=3
2. Cardinal divided by a cardinal yields an ordinal quotient 9/3=4
3. Cardinal divided by an ordinal yields a cardinal quotient 9/3=4.5
4. Cardinal divided by an ordinal yields an ordinal quotient 9/3=5.6
5. Ordinal divided by a cardinal yields a cardinal quotient 9/3=2.67
6.*** Ordinal divided by a cardinal equals an ordinal quotient 9/3yields3.78
7. Ordinal divided by an ordinal yields a cardinal quotient 9/3=4
8.** Ordinal divided by an ordinal equals an ordinal quotient 9/3yields5

The above examples are illustrated hereinafter.

* Capabilities of the old cardinal calculator.

Thus the cardinal-ordinal calculator has 8 times the capability of the old cardinal calculator for basic operations.

** Capabilities of new ordinal calculator alone.
*** Computed after graphical forms.

EXAMPLES OF CALCULATION WITH THE NEW CALCULATOR IN GRAPHIC FORM

In the following examples, cardinals count horizontal movements on a keyboard and are represented by the space between keys, — .

Ordinals count vertical strokes on a keyboard and are represented by the keys themselves, 0 .

$6_c$ = Cardinal Number 6; $6_o$ = Ordinal Number 6; etc.

ADDITION

1. & 2. $6_c+5_c=11_c=22_o$

```
o                       6
0—0—0—0—0—0—0—0—0—0—0—0
                        o           5
o—Cardinal 11 — ——————————→11
1—Ordinal  22  0 ——————————→22
```

3. & 4. $6_c+5_o=10_c=21_o$

```
o                       6
0—0—0—0—0—0—0—0—0—0—0
                        1           5
o—Cardinal 10 —   ————————→10
1—Ordinal  21  0  ————————→21
```

5. & 6. $6_o+5_c=10_c=21_o$

```
1                   6
0—0—0—0—0—0—0—0—0—0—0
                    o               5
o—Cardinal 10 —   ————————→10
1—Ordinal  21  0  ————————→21
```

7. & 8. $6_o+5_o=9_c=0_o$

```
1                   6
0—0—0—0—0—0—0—0—0—0
                    1           5
o—Cardinal 9 —  ——————→9
1—Ordinal  0  0 ——————→0 (The Tenth Key)
```

SUBTRACTION

1. & 2. $9_c-5_c=4_c=5_o$

```
o                                   9
0—0—0—0—0—0—0—0—0—0
                5                   o
o——————→ 4 Cardinal —
1——————→ 5 Ordinal  0
```

3. & 4. $9_o-5_c=3_c=4_o$

```
1                               9
0—0—0—0—0—0—0—0—0
            5                   o
o——————→3 Cardinal 3 —
1——————→4 Ordinal  4  0
```

5. & 6. $9_c-5_o=5_c=6_o$

```
o                                   9
0—0—0—0—0—0—0—0—0—0
                    5               1
o——————→5 — Cardinal
1——————→6  0 Ordinal
```

7. & 8. $9_o-5_o=4_c=5_o$

```
1                               9
0—0—0—0—0—0—0—0—0
                5               1
o——————→4 Cardinal —
1——————→5 Ordinal   0
```

MULTIPLICATION

1. & 2. $3_c \times 5_c = 15_c = 26_o$

```
5           5           5           5
0—0—0—0—0—0—0—0—0—0—0—0—0—0—0—0
o           1           2           3
o— Cardinal — ————————————————→15
1— Ordinal 0 ——————————————————→26
```

3. & 4. $3_c \times 5_o = 12_c = 23_o$

```
1       5       1       5
0—0—0—0—0—0—0—0—0—0—0—0—0
o       1       2       3
o Cardinal ——————————→12
1 Ordinal  ——————————→23
```

5. & 6. $3_o \times 5_c = 10_c = 21_o$

```
o       5
0—0—0—0—0—0—0—0—0—0—0
1       2           3
o Cardinal ————————→10
1 Ordinal  ————————→21
```

7. & 8. $3_o \times 5_o = 8_c = 9_o$

```
0—0—0—0—0—0—0—0—0
1     2       3
o Cardinal ——————→8
1 Ordinal  ——————→9
```

DIVISION

1. & 2. $9_c \div 3_c = 3_c = 4_o$

```
o                 9
0—0—0—0—0—0—0—0—0—0
o    1     2      3
o Cardinal—→3
1 Ordinal——→4
```

3. & 4. $9_c \div 3_o = 4.5_c = 5.6_o$

```
o                 9
0—0—0—0—0—0—0—0—0—0
1     2           3
o Cardinal ———→4 (Neglecting Decimal Fraction)
1 Ordinal ———→5 (Neglecting Decimal Fraction)
```

5. & 6. $9_o / 3_c = 2.67_c = 3.78_o$

```
1               9
0—0—0—0—0—0—0—0—0
o   1    2      3
o ———→2 Cardinal 2 — Neglecting Decimal Fraction
o ———→3 Ordinal 3 0 Neglecting Decimal Fraction
```

7. & 8. $9_o / 3_o = 4_c = 5_o$

```
1               9
0—0—0—0—0—0—0—0—0
1     2         3
o ————→4  4 — Cardinal
1 ————→5  5 0 Ordinal
```

EXAMPLES OF CARDINAL-ORDINAL CALCULATION

I. Cardinal multiplied by an ordinal yielding an ordinal product. 3 × 5 = 23

3 is a cardinal, 5 is an ordinal, 23 is an ordinal.

3×5=23 (The third times five = the third one of the second group of ten).

Set shift key S to cardinal.

Enter 3.

Enter ×.

Set shift key S to ordinal.

Enter 5.

Enter =.

Read ordinal number 23 on output register.

II. Ordinal divided by a cardinal yielding an ordinal quotient. 9 / 3 = 3.78

9 is an ordinal, 3 is a cardinal, 3.78 is an ordinal.

9/3=3.78 (The nineth divided by three = the eighth hundredth belonging to the seventh tenth of the third one).

Set Shift key S to ordinal.

Enter 9.

Enter .

Set shift key S to cardinal.

Enter 3.

Set shift key S to ordinal.

Enter =.

Read ordinal number 3.78 on output register.

III. A maintenance schedule starts 5.8 (the eight tenth of May) and starts again every 1.6 months. Compute the starting date of the 4th scheduled maintenance.

The starting date of the 4th maintenance schedule is 5.8 + 4 × (1.6) = 0.6

5.8 is an ordinal = May 23 on conventional calendar.

4 is an ordinal.

1.6 is a cardinal.

0.4 is an ordinal.

Set shift key S to cardinal.

Enter 1.6.

Enter ×.

Set shift key S to ordinal.

Enter 4.

Enter =.

Read ordinal number 5.9 on output register (The 9th tenth of the 5th month).

Clear register.

Enter 5.8.

Enter +.

Enter 5.9.

Enter =.

Read ordinal number 0.6 on output register (The sixth tenth of the tenth month).

0.6 = the 4th tenth of October.

= October 17 on conventional calendar.

IV. Arrange the alphabet from A to Z into a decimal card filing system with equal spacing for each letter. Label each drawer by column number and row number and label each slot in a drawer by bin number and slot number. Compute the file number of the 1st slot for each letter.

There are 26 letters in the alphabet and 26 is a cardinal number.

Each letter is an ordinal number, eg: *c* = the 3rd letter, *z* = the 36th letter; the 6th letter of the 3rd group of ten letters.

The file number of the 1st slot for each letter is obtained by dividing the ordinal letter number by the cardinal number of letters in the alphabet (Reference Example II) to four place accuracy.

Letter A = 1/26 = .1111; letter A begins in the 1st slot of the 1st bin of the 1st row of the 1st column (reading from right to left).

Letter B = 2/26 = .1496

Letter C = 3/26 = .1881

Letter X = 34/26 = .9951

Letter Y = 35/26 = .0341; letter Y begins in the 1st slot of the 4th bin of the 3rd row of the 0th (tenth) column.

Letter Z = 36/26 = .0731

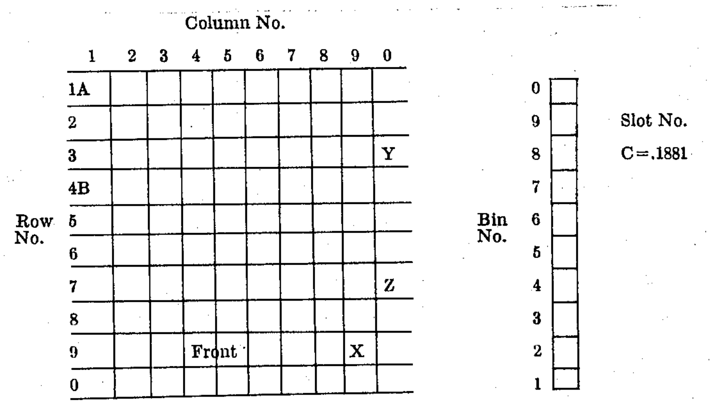

Front of Drawer labeled 18.

Drawer No.=(Col. No., Row No.) in that order.

ANOTHER EXAMPLE

A slow motion camera view of the fingers of a calculator operator on the job shows two kinds of counting going on plus various combinations. This view is a replica of the operations of an industrial complex as a whole as follows:

a. Counts of the horizontal movements of the fingers between keys is cardinal counting and represents counting money, lengths, sizes and quantitative amounts of material, etc.

b. Counts of the vertical strokes of the fingers on the keys is called ordinal counting and represents assembly, scheduling, filing and qualitative ranks of material, etc.

c. Interacting combinations of (a) and (b) above.

FURTHER EXAMPLES

The shift key allows cardinal, ordinal, or both types of counting on the same machine. Familiar industrial cardinal-ordinal counting operations are as follows:

a. Sequential Order (requires ordinal operations).

b. Groups (require cardinal operations).

c. Sequentially Ordered Elements of Groups & Sub-Groups (requires both cardinal & ordinal operations).

EXAMPLES OF TRUE ORDINAL OPERATION OF THE NEW CALCULATOR

ADDITION: No. 8** 6 + 5 = 0 (The sixth plus the fifth = the tenth)

1. Set shiftkey 30 to "ORDINAL" which shifts gang switches **15*a* and 15*b* up to ordinal position. Thus keys 6 and 5 on the Input Keyboard activate terminals 5 and 4, respectively, of the Central Processing unit 13*c* input through gang switch 15*a***,
2. Enter 6 and 5 in Input Keyboard **12*c***,
3. Enter +, and numbers 5 and 4 and the Central Processing Unit Terminal 9 is activated,
4. Terminal 9 of the Central Processing unit output then activates terminal 0 of the Output Display **14*c* through gang switch 15*b***, and
5. Thus, ordinal numeral "0" or "10" (the tenth) is the sum of the ordinal numbers 6 and 5.

Likewise:

SUBTRACTION: No. 8** 9–5=5 (The nineth minus the fifth = the fifth).

MULTIPLICATION No. 8** 3×5=9 (The third times the fifth = the nineth).

DIVISION: No. 8** 9/3=5 (The nineth divided by the third = the fifth).

TABLES

The addition, subtraction, multiplication, and division tables for ordinal decimal digits from the first (1) through the first one of the second group of ten (21) and the corresponding ordinal binary digits from the first (1) through the first one of the second group of two (01) are as follows:

ORDINAL DECIMAL ADDITION TABLE
p+q

| + | q | | | | | | | | | | |
|---|---|---|---|---|---|---|---|---|---|---|---|
| | 1 | 2 | 3 | 4 | 5 | 6 | 7 | 8 | 9 | 0 | 21 |
| p 1 | 1 | 2 | 3 | 4 | 5 | 6 | 7 | 8 | 9 | 0 | 21 |
| 2 | 2 | 3 | 4 | 5 | 6 | 7 | 8 | 9 | 0 | 21 | 22 |
| 3 | 3 | 4 | 5 | 6 | 7 | 8 | 9 | 0 | 21 | 22 | 23 |
| 4 | 4 | 5 | 6 | 7 | 8 | 9 | 0 | 21 | 22 | 23 | 24 |
| 5 | 5 | 6 | 7 | 8 | 9 | 0 | 21 | 22 | 23 | 24 | 25 |
| 6 | 6 | 7 | 8 | 9 | 0 | 21 | 22 | 23 | 24 | 25 | 26 |
| 7 | 7 | 8 | 9 | 0 | 21 | 22 | 23 | 24 | 25 | 26 | 27 |
| 8 | 8 | 9 | 0 | 21 | 22 | 23 | 24 | 25 | 26 | 27 | 28 |
| 9 | 9 | 0 | 21 | 22 | 23 | 24 | 25 | 26 | 27 | 28 | 29 |
| 0 | 0 | 21 | 22 | 23 | 24 | 25 | 26 | 27 | 28 | 29 | 20 |
| 21 | 21 | 22 | 23 | 24 | 25 | 26 | 27 | 28 | 29 | 20 | 31 |

E.g.: 7+9=25.
The seventh plus the ninth = the fifth one of the second group of ten.

ORDINAL DECIMAL SUBTRACTION TABLE
p−q

| − | q | | | | | | | | | | |
|---|---|---|---|---|---|---|---|---|---|---|---|
| | 1 | 2 | 3 | 4 | 5 | 6 | 7 | 8 | 9 | 0 | 21 |
| p 1 | 1 | −2 | −3 | −4 | −5 | −6 | −7 | −8 | −9 | −0 | −21 |
| 2 | 2 | 1 | −2 | −3 | −4 | −5 | −6 | −7 | −8 | −9 | −0 |
| 3 | 3 | 2 | 1 | −2 | −3 | −4 | −5 | −6 | −7 | −8 | −9 |
| 4 | 4 | 3 | 2 | 1 | −2 | −3 | −4 | −5 | −6 | −7 | −8 |
| 5 | 5 | 4 | 3 | 2 | 1 | −2 | −3 | −4 | −5 | −6 | −7 |
| 6 | 6 | 5 | 4 | 3 | 2 | 1 | −2 | −3 | −4 | −5 | −6 |
| 7 | 7 | 6 | 5 | 4 | 3 | 2 | 1 | −2 | −3 | −4 | −5 |
| 8 | 8 | 7 | 6 | 5 | 4 | 3 | 2 | 1 | −2 | −3 | −4 |
| 9 | 9 | 8 | 7 | 6 | 5 | 4 | 3 | 2 | 1 | −2 | −3 |
| 0 | 0 | 9 | 8 | 7 | 6 | 5 | 4 | 3 | 2 | 1 | −2 |
| 21 | 21 | 0 | 9 | 8 | 7 | 6 | 5 | 4 | 3 | 2 | 1 |

E.g.: 7−9=−3.
The seventh minus the ninth = minus the third = third.
N.B.—(Article "the" and suffixes "st", "nd", "rd", and "th" are grammatical expressions for minus, i.e.: The 7th = −(−7) = 7; 3rd = −3.

ORDINAL DECIMAL MULTIPLICATION TABLE
p×q

| × | q | | | | | | | | | | |
|---|---|---|---|---|---|---|---|---|---|---|---|
| | 1 | 2 | 3 | 4 | 5 | 6 | 7 | 8 | 9 | 0 | 21 |
| p 1 | 1 | 1 | 1 | 1 | 1 | 1 | 1 | 1 | 1 | 1 | 1 |
| 2 | 1 | 2 | 3 | 4 | 5 | 6 | 7 | 8 | 9 | 0 | 21 |
| 3 | 1 | 3 | 5 | 7 | 9 | 21 | 23 | 25 | 27 | 29 | 31 |
| 4 | 1 | 4 | 7 | 0 | 23 | 26 | 29 | 32 | 35 | 38 | 41 |
| 5 | 1 | 5 | 9 | 23 | 27 | 31 | 35 | 39 | 43 | 47 | 51 |
| 6 | 1 | 6 | 21 | 26 | 31 | 36 | 41 | 46 | 51 | 56 | 61 |
| 7 | 1 | 7 | 23 | 29 | 35 | 41 | 47 | 53 | 59 | 65 | 71 |
| 8 | 1 | 8 | 25 | 32 | 39 | 46 | 53 | 60 | 67 | 74 | 81 |
| 9 | 1 | 9 | 27 | 35 | 43 | 51 | 59 | 67 | 75 | 83 | 91 |
| 0 | 1 | 0 | 29 | 38 | 47 | 56 | 65 | 74 | 83 | 92 | 01 |
| 21 | 1 | 21 | 31 | 41 | 51 | 61 | 71 | 81 | 91 | 01 | 211 |

E.g.: 7×9=59.
The seventh times the ninth = the ninth one of the fifth group of ten.

ORDINAL DECIMAL DIVISION TABLE
p÷q

| ÷ | | q | | | | | | | | | | |
|---|---|---|---|---|---|---|---|---|---|---|---|---|
| | | 1 | 2 | 3 | 4 | 5 | 6 | 7 | 8 | 9 | 0 | 21 |
| p | 1 | * | 1 | 1 | 1 | 1 | 1 | 1 | 1 | 1 | 1 | 1 |
| | 2 | ** | 2 | 1.6 | 1.4 | 1.3 | 1.3 | 1.2 | 1.2 | 1.2 | 1.2 | 1.2 |
| | 3 | ** | 3 | 2 | 1.7 | 1.6 | 1.5 | 1.4 | 1.3 | 1.3 | 1.3 | 1.3 |
| | 4 | ** | 4 | 2.6 | 2 | 1.8 | 1.7 | 1.6 | 1.5 | 1.4 | 1.4 | 1.4 |
| | 5 | ** | 5 | 3 | 2.4 | 2 | 1.9 | 1.7 | 1.6 | 1.6 | 1.5 | 1.5 |
| | 6 | ** | 6 | 3.6 | 2.7 | 2.3 | 2 | 1.9 | 1.8 | 1.7 | 1.6 | 1.6 |
| | 7 | ** | 7 | 4 | 3 | 2.6 | 2.3 | 2 | 1.9 | 1.8 | 1.7 | 1.7 |
| | 8 | ** | 8 | 4.6 | 3.4 | 2.8 | 2.5 | 2.2 | 2 | 1.9 | 1.8 | 1.8 |
| | 9 | ** | 9 | 5 | 3.7 | 3 | 2.7 | 2.4 | 2.2 | 2 | 1.9 | 1.9 |
| | 0 | ** | 0 | 5.6 | 4 | 3.3 | 2.9 | 2.6 | 2.3 | 2.2 | 2 | 1.0 |
| | 21 | ** | 21 | 6 | 4.4 | 3.6 | 3 | 2.7 | 2.5 | 2.3 | 2.2 | 2 |

E.g.: 7÷9=1.8=.8. Correct at the "Tenth" Place.
The seventh divided by the ninth=the eighth tenth of the first one=the eighth tenth.
N.B. *=ordinal indeterminate. **=ordinal infinity.

1. Five day week in the ordinal decimal system. Switch (S) in ordinal position.

Monday is the 1st day
Friday is the 5th day
All Mondays etc, are sextuplicates (6 ths).

Monday of the 5th week; 5+1/6=5.1
Tuesday of the 5th week; 5+2/6=5.3
Wednesday of the 5th week; 5+3/6=5.5
Thursday of the 5th week; 5+4/6=5.7
Friday of the 5th week; 5+5/6=5.9

2. Seven day week in the ordinal decimal system. Switch (S) in ordinal position

Sunday is the 1st day
Saturday is the 7th day
All Sundays etc. are octaves (8ths).

Sunday of the 8th week; 8+1/8=8.111
Monday of the 8th week; 8+2/8=8.254
Tuesday of the 8th week; 8+3/8=8.397
Wednesday of the 8th week; 8+4/8=8.530
Thursday of the 8th week; 8+5/8=8.682
Friday of the 8th week; 8+6/8=8.827
Saturday of the 8th week; 8+7/8=8.960.

3. An item will be delivered on the 20th day starting from Wednesday of the 1st week. What week & day will the delivery be made based on a five day week?

$$1.5+20/6=1.5+4.9$$

$$=5.3$$

=Tuesday of the 5th week.

4. On a seven day week the first item is scheduled for Thursday of the 5th week. The 20th item is scheduled for Tuesday of the 0th (the tenth) week. When will the 9th item be scheduled?

$$5.682+[(0.397-5.682)\times 9/20]=5.682+2.096$$

$$=7.667$$

=Wednesday of the 7th week.

DESCRIPTION OF DUAL PURPOSE BINARY CARDINAL-ORDINAL CALCULATOR FOR BINARY CARDINAL AND ORDINAL NUMBERS

FIG. 7 illustrates the binary counterpart of the preceding calculator of FIG. 5. This calculator **11*d* also comprises three portions comprising an input keyboard unit 12*d*, a central processing unit 13*d*, an output display unit 14*d*** of a conventional cardinal calculator, but with the connections between the terminals raised up one terminal to form the new cardinal-ordinal binary calculator, and two gang switches interconnected therein.

Accordingly, two binary ordinal number terminals 1 and O, FIG. 6, on the input keyboard unit **12*d* are connected through double throw switches 1*a* and 0*a* of input binary double pole double throw gang switch 15*c* to the respective terminals 1 and 0 on the central processing unit 13*d* input. Likewise, two terminals 1 and 0 of the central processing unit 13*d* output are connected through double throw switches 1*a* and 0*a*, respectively, of the output binary double pole double throw gang switch 15*d* to the respective terminals 1 and 0 of the output display unit 14*d***.

When "CARDINAL" key is depressed, the symbol "0" is defined a zero in cardinal numbers, and when "ORDINAL" key is depressed, the symbol "0" is defined as "the second" in ordinal numbers.

Similarly to FIG. 4, the selective operation keys +, −, ×, , =, and the binary point . , FIG. 7 of the input keyboard unit **12*d*** are connected to their respective terminals *a*, *b*, *c*, *d*, *e*, and *f* for controlling the central processing unit **13*d*** for generating the selectice mathematical function with binary ordinal or cardinal numbers.

Thus, the calculator of FIG. 7 is the binary counterpart of the calculator of FIG. 5.

ORDINAL BINARY OPERATION TABLES
(1=the first: 0=the second)

ORDINAL BINARY ADDITION TABLE p+q.

| + | | q | | |
|---|---|---|---|---|
| | | 1 | 0 | 01 |
| p | 1 | 1 | 0 | 01 |
| | 0 | 0 | 01 | 00 |
| | 01 | 01 | 00 | 011 |

E.g.: 0+01=00.
The second plus the first one of the second group of two=the second one of the second group of two.

ORDINAL BINARY SUBSTRACTION TABLE p−q.

| − | | q | | |
|---|---|---|---|---|
| | | 1 | 0 | 01 |
| p | 1 | 1 | −0 | −01 |
| | 0 | 0 | 1 | −0 |
| | 01 | 01 | 0 | 1 |

E.g.: 0−01=−0.
The second minus the first one of the second group of two=minus the second=2nd.
N.B. (Article "the" and Suffix "st" and "nd" are grammatical expressions for minus i.e.: The Ond=−(−O)=O; −O=Ond).

ORDINAL BINARY MULTIPLICATION TABLE p×q.

| × | | q | | |
|---|---|---|---|---|
| | | 1 | 0 | 01 |
| p | 1 | 1 | 1 | 1 |
| | 0 | 1 | 0 | 01 |
| | 01 | 1 | 01 | 011 |

E.g.: 0×01=01.
The second times the first one of the second group of two=the first one of the second group of two.

ORDINAL BINARY DIVISION TABLE p÷q.

| ÷ | | q | | |
|---|---|---|---|---|
| | | 1 | 0 | 01 |
| p | 1 | * | 1 | 1 |
| | 0 | ** | 0 | 1.0 |
| | 01 | ** | 01 | 0 |

E.g.: 0÷01=1.0=0.
The second one divided by the first one of the second group of two=the second half of the first one=the second half.

N.B. *=Ordinal indeterminate. **=Ordinal infinity.

It will thus be seen that various calculators and computers have been disclosed in a manner which meets each of the objects set forth above.

While only a few embodiments of the invention have been shown in the accompanying specification and drawings, it will be evident that various other modifications are possible in the arrangement and construction of the disclosed calculators without departing from the scope of the invention, and it is accordingly desired to comprehend within the purview of this invention such modifications as may be considered to fall within the scope of the appended claims.

I claim:

1. In a calculator comprising an input keyboard unit having first and second terminals, a central processing unit having first and second input terminals and first and second output terminals, and an output display unit having first and second terminals wherein a cardinal calculator would be formed with the input keyboard unit first terminal being connected to the central processing unit input first terminal, with the central processing unit output first terminal being connected to the output display unit first terminal, with the input keyboard unit second terminal being connected to the central processing unit input second terminal, and with the central processing unit output second terminal being connected to the output display unit second terminal, the calculator comprising an ordinal calculator with, a. said second terminal of said input keyboard unit being connected to said first input terminal of said central processing unit, and
b. said first output terminal of said central processing unit being connected to said second terminal of said output display unit for forming the ordinal calculator.

2. An ordinal calculator as defined in claim 1 wherein, a. the input keyboard unit, the central processing input and output unit, and the output display unit each has at least a third terminal,
b. said third terminal of the input keyboard unit is connected to the second terminal of the central processing unit, and
c. the second terminal of the central processing unit output is connected to said third terminal of the output display unit for forming an ordinal calculator.

3. An ordinal calculator as defined in claim 1 wherein, a. the input keyboard unit, the central processing input and output unit, and the output display unit each have a last terminal and a penultimate terminal,
b. said last terminal of the input keyboard unit is connected to said penultimate terminal of the central processing unit input, and
c. said penultimate terminal of the central processing unit output is connected to said last terminal of the output display unit.

4. An ordinal calculator as defined in claim 3 wherein, a. the first terminal of the input keyboard unit is connected to the last terminal of the central processing unit input, and
b. the last terminal of the central processing unit output is connected to the first terminal of the output display unit.

5. An ordinal calculator as defined in claim 3 wherein, a. the last terminal of the input keyboard unit is connected to the first terminal of the central processing unit input, and
b. the first terminal of the central processing unit output is connected to the last terminal of the output display unit.

6. A calculator as defined in claim 5 wherein, a. the calculator has switching means for connecting the second terminal of the input keyboard unit to the first input terminal of the central processing unit, and
b. said switching means connects the first output terminal of the central processing unit to the second terminal of the output display for forming a cardinal-ordinal calculator.

7. An ordinal calculator as defined in claim 1 wherein, a. the input keyboard unit, the central processing input and output unit, and the output display unit each have a last terminal and a penultimate terminal,
b. said penultimate terminal of the input keyboard unit is connected to said last terminal of the central processing unit input, and
c. said last terminal of the central processing unit output is connected to said penultimate terminal of the output display unit.

8. An ordinal calculator as defined in claim 1 wherein, a. the first terminal of the input keyboard unit is connected to the second terminal of the central processing unit input, and
b. The second terminal of the central processing unit output is connected to the first terminal of the output display unit.

9. A calculator as defined in claim 1 wherein, a. The input keyboard unit has an addition operation key connected to the central processing unit for control thereof, and
b. actuation of said addition key forms an ordinal calculator for generating an ordinal number sum in the output display unit from two ordinal numbers input in the first and second terminals of the input keyboard unit.

10. A calculator as defined in claim 1 wherein, a. the input keyboard unit has a subtraction operation key connected to the central processing unit for control thereof, and
b. actuation of said subtraction key forms an ordinal calculator for generating an ordinal number difference in the output display unit from two ordinal numbers input in the first and second terminals of the input keyboard unit.

11. A calculator as defined in claim 1 wherein, a. the input keyboard unit has a multiplication operation key connected to the central processing unit for control thereof, and
b. actuation of said multiplication key forms an ordinal calculator for generating an ordinal number product in the output display unit from two ordinal numbers input in the first and second terminals of the input keyboard unit.

12. A calculator as defined in claim 1 wherein, a. the input keyboard unit has a division operation key connected to the central processing unit for control thereof, and
b. actuation of said division key forms an ordinal calculator for generating an ordinal number quotient in the output display unit from two ordinal numbers input in the first and second terminals of the input keyboard unit.

13. A calculator as defined in claim 1 wherein, a. the calculator has switching means for interconnecting all of the first terminals for forming a cardinal calculator.

14. A calculator as defined in claim 13 wherein, a. the switching means connects a third terminal of the input keyboard unit to a second input terminal of the central processing unit, and b. the switching means connects a second output terminal of the central processing unit to a third terminal of the output display unit for forming a cardinal-ordinal calculator.

15. A cardinal-ordinal calculator having an input keyboard unit, a central processing unit, and an output display unit, each unit having a plurality of terminals with the input keyboard unit first terminal being connected to the central processing unit first terminal, with the central processing unit first terminal being connected to the output delay unit first terminal, with the input keyboard unit second terminal being connected to the central processing unit second terminal, and with the central processing unit second terminal being connected to the output display unit second terminal, for generating a cardinal number in the display unit from input cardinal numbers in the input keyboard, the calculator further comprising, a. first switching means for connecting said second terminal of said input keyboard to said first terminal of said central processing unit input, and b. second switching means for connecting said first output terminal of said central processing unit to said second terminal of said output display for generating an ordinal number in the first terminal of the display unit from an ordinal number input in the first terminal of the input keyboard.

16. An ordinal calculator as defined in claim 15 wherein, a. the input keyboard unit, the central processing input and output unit, and the output display unit each have a last terminal and a penultimate terminal, b. the first switching means connects said last terminal of the input keyboard unit to said penultimate terminal of the central processing unit input, and c. the second switching means connects said penultimate terminal of the central processing unit output to said last terminal of the output display unit.

17. An ordinal calculator as defined in claim 15 wherein, a. each of the units has a last terminal, b. the first switching means connects the first terminal of the central processing unit output to the first terminal of the output display unit.

18. An ordinal calculator as defined in claim 15 wherein, a. the input keyboard unit, the central processing input and output unit, and the output display unit each has at least a third terminal, b. the first switching means connects said third terminal of the input keyboard unit to the second input terminal of the central processing unit, and c. the second switching means connects the second output terminal of the central processing unit to said third terminal of the output display unit.

19. A cardinal-ordinal calculator as recited in claim 15 wherein, a. the first switching means connects the second terminal of the input keyboard to the first terminal of the central processing unit input, and b. the second switching means connects the first output terminal of the central processing unit to the second terminal of the output display for generating an ordinal number in the display unit second terminal from an ordinal number input in the second terminal of the input keyboard.

20. An ordinal calculator as defined in claim 15 wherein, a. each of said units having a third terminal, b. the first switching means connects said third terminal of the input keyboard unit to the second terminal of the central processing unit input, c. the second switching means connects the second terminal of the central processing unit output to said third terminal of the output display unit, d. the input keyboard unit has an addition operation key connected to the central processing unit for control thereof, and e. actuation of said addition key forms an ordinal calculator for generating an ordinal number sum in the output display unit from two ordinal numbers input in the first and second terminals of the input keyboard unit.

21. An ordinal calculator as defined in claim 20 wherein, a. the input keyboard unit has a subtraction operation key connected to the central processing unit for control thereof, and b. actuation of said subtraction key forms an ordinal calculator for generating an ordinal number difference in the output display unit from two ordinal numbers input in the first and second terminals of the input keyboard unit.

22. A calculator as defined in claim 20 wherein, a. the input keyboard unit has a multiplication operation key connected to the central processing unit for control thereof, and b. actuation of said multiplication key forms an ordinal calculator for generating an ordinal number product in the output display unit from two ordinal numbers input in the first and second terminals of the input keyboard unit.

23. A calculator as defined in claim 20 wherein, a. the input keyboard unit has a division operation key connected to the central processing unit for control thereof, and b. actuation of said division key forms an ordinal calculator for generating an ordinal number quotient in the output display unit from two ordinal numbers input in the first and second terminals of the input keyboard unit.

24. A cardinal-ordinal calculator having an input keyboard unit, a central processing unit, and an output display unit, all units being interconnected, and selectable addition, subtraction, multiplication, and division operation keys connected to said central processing unit for control thereof, said cardinal-ordinal calculator comprising, a. first switching means for connecting a first terminal on said input keyboard unit to a first terminal on said central processing unit input, b. second switching means for connecting a first terminal on said central processing unit output to a first terminal on said output display unit, c. said first switching means connects a second terminal on said input keyboard unit to a second terminal on said central process unit input, d. said second switching means connects a second terminal on said central processing unit output to a second terminal on said output display unit with both switching means in one position whereby said cardinal-ordinal calculator may perform the function of a cardinal calculator for generating a cardinal number of the selected sum, difference, product, and quotient keys in the output display unit from two cardinal numbers input in the first and second terminals in the input keyboard unit corresponding to the key operated, and e. said second terminal on said input keyboard unit is connectable by said first switching means to said first terminal on said central processing unit input, f. said first terminal on said central processing unit output is connectable by said second switching means to said second terminal on said output display unit, g. a third terminal on said input keyboard unit is connectable by said first switching means to said second terminal on said central processing unit input, and h. said second terminal on said central processing unit output is connectable by said second switching means to a third terminal on said output display unit with both switching means in a second position so that said cardinal-ordinal calculator may perform the function of an ordinal calculator for generating an ordinal number of the selected sum, difference, product, and quotient keys in said output display unit from two ordinal numbers input in said first and second terminals in said input keyboard unit.

25. In a calculator comprising an input keyboard unit having first and second terminals, a central processing unit having first and second input terminals and first and second output terminals, and an output display unit having first and second terminals wherein a cardinal calculator would be formed with the input keyboard unit first terminal being connected to the central processing unit input first terminal, with the central processing unit output first terminal being connected to the output display unit first terminal, with the input keyboard unit second terminal being connected to the central processing unit input second terminal, and with the central processing unit output second terminal being connected to the output display unit second terminal, a method for forming an ordinal calculator comprising, a. connecting at least one of the terminals of the input keyboard unit to the next lower input terminal of the central processing unit, and b. connecting the output terminal of the central processing unit corresponding to the above recited next lower input terminal of the central processing unit to the next higher terminal of the output display unit.

26. An ordinal calculator as defined in claim 1 wherein, a. the input keyboard unit has selectable addition, subtraction, multiplication, and division operation keys connected to the central processing unit for control thereof, b. each of the three units has a third terminal, c. said third terminal of the input keyboard unit is connected to the second terminal of the central processing unit input, and d. the second terminal of the central processing unit output is connected to said third terminal of the output display unit for forming an ordinal calculator for generating an ordinal number of the selected sum, difference, product, and quotient keys in the output display unit from two ordinal numbers input in the first and second terminals of the input keyboard unit.

* * * * *